(12) United States Patent
Takeshima et al.

(10) Patent No.: US 7,776,783 B2
(45) Date of Patent: Aug. 17, 2010

(54) CATALYST CARRIER AND EXHAUST GAS PURIFICATION CATALYST

(75) Inventors: Shinichi Takeshima, Numazu (JP); Akio Koyama, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 12/084,050

(22) PCT Filed: Oct. 24, 2006

(86) PCT No.: PCT/JP2006/321589
§ 371 (c)(1),
(2), (4) Date: Apr. 24, 2008

(87) PCT Pub. No.: WO2007/049778
PCT Pub. Date: May 3, 2007

(65) Prior Publication Data
US 2009/0131249 A1    May 21, 2009

(30) Foreign Application Priority Data

Oct. 24, 2005  (JP) ............ 2005-308552
Jul. 14, 2006  (JP) ............ 2006-194548

(51) Int. Cl.
*B01J 23/00* (2006.01)
*B01J 21/00* (2006.01)

(52) U.S. Cl. .................. 502/303; 502/236

(58) Field of Classification Search ............ None
See application file for complete search history.

(56) References Cited

U.S. PATENT DOCUMENTS

2006/0216227 A1* 9/2006 Idem et al. ............ 423/651
2007/0066479 A1* 3/2007 Takeshima et al. ........ 502/303

FOREIGN PATENT DOCUMENTS

| CN | 1657139 | 8/2005 |
|---|---|---|
| GB | 1 369 745 | 10/1974 |
| JP | 61-35851 | 2/1986 |
| JP | 63-264150 | 11/1988 |
| JP | 2-175602 | 7/1990 |
| JP | 3-52642 | 3/1991 |
| JP | 4-180835 | 6/1992 |
| JP | 4-284847 | 10/1992 |
| JP | 4-298235 | 10/1992 |
| JP | 7-136463 | 5/1995 |
| JP | 8-117601 | 5/1996 |
| JP | 9-141098 | 6/1997 |
| JP | 9-313938 | 12/1997 |
| JP | 11-169728 | 6/1999 |
| JP | 2001-252563 | 9/2001 |
| JP | 2001-314763 | 11/2001 |
| JP | 2002-1120 | 1/2002 |
| JP | 2002-79094 | 3/2002 |
| JP | 2002-233755 | 8/2002 |
| JP | 2002-331238 | 11/2002 |
| JP | 2002-346387 | 12/2002 |
| JP | 2004-262702 | 9/2004 |
| JP | 2006-35153 | 2/2006 |
| JP | 2007283207 | * 4/2006 |
| JP | 2006-116418 | 5/2006 |
| JP | 2006-137651 | 6/2006 |
| JP | 2006-297237 | 11/2006 |
| WO | WO 2005/014166 | 2/2005 |
| WO | WO 2005/039759 | 5/2005 |

OTHER PUBLICATIONS

Atsushi Ogata, et al., "Enhancement effect of $Mg^{2+}$ ion on direct nitric oxide decomposition over supported palladium catalysts," *Appl. Catalysis*, 65 (1990) L11-L15.

X. Li, et al., "A new $NO_x$ storage-reduction electrochemical catalyst," *Appl. Catalysis B: Environ.*, 61 (2005) 267-273.

G. Foti, et al., "Electrochemical promotion of Rh catalyst in gas-phase reduction of NO by propylene," *J. Appl. Electrochem.*, 30 (2000) 1223-1228.

H. Cheng, et al., "$NO_x$ Storage Performance of PT/Mg-Al-O Catalyst," *Chin. J. Catalysis*, vol. 25, No. 4 (Apr. 2004), pp. 272-276.

G. Fomasari et al., "Role of the Mg/Al atomic ratio in hydrotalcite-based catalysts for $NO_x$ storage/reduction," *Appl. Clay Sci.*, 29 (2005) pp. 258-266.

B. A. Silletti, et al., "A novel $Pd/Mg/AlO_x$ catalyst for $NO_x$ storage-reduction," *Catalysis Today*, 114 (2006), pp. 64-71.

* cited by examiner

*Primary Examiner*—Melvin C Mayes
*Assistant Examiner*—Sheng Han
(74) *Attorney, Agent, or Firm*—Finnegan, Henderson, Farabow, Garrett & Dunner, LLP

(57) ABSTRACT

A catalyst carrier and exhaust gas purification catalyst superior in sintering inhibiting effect of precious metal catalyst particles are provided, that is, a catalyst carrier for carrying a precious metal comprised of a composite oxide of an electron accepting element (La) having an electron accepting property of accepting electrons from a precious metal element by approach or contact with the precious metal element (Pt) and not changing in atomic valence in an oxidation reduction reaction and of another element (Si) and, further, an exhaust gas purification catalyst comprised of this catalyst carrier on which precious metal catalyst particles are carried.

15 Claims, 6 Drawing Sheets

○ O  ○ La  · Si

CATALYST CARRIER AND EXHAUST GAS PURIFICATION CATALYST

TECHNICAL FIELD

The present invention relates to a catalyst carrier for carrying precious metal catalyst particles and to an exhaust gas purification catalyst comprised of this catalyst carrier on which precious metal catalyst particles are carried.

BACKGROUND ART

In a catalyst carrying precious metal particles as the catalyst component on a carrier, to improve the activity, the precious metal particles are carried on the carrier in the form of fine particles. This is so as to make the specific area of the catalyst component as large as possible. However, if reducing the particle size of the catalyst component, the surface energy increases and therefore sintering easily occurs. In particular, in an exhaust gas purification catalyst, the heat of the exhaust gas and the heat of reaction expose the catalyst to a high temperature of several hundred degrees, so the precious metal particles tend to progressively sinter and the particle size to increase and activity to drop.

A catalyst carrier able to prevent sintering of the precious metal catalyst particles is described in Japanese Patent Publication (A) No. 4-180835 and Japanese Patent Publication (A) No. 2002-346387.

Japanese Patent Publication (A) No. 4-180835 discloses an exhaust gas purification catalyst making high activity ceria powder carry a platinum family catalyst metal as large particles of colloid particles. Japanese Patent Publication (A) No. 4-180835 states that according to this exhaust gas purification catalyst, it is possible to prevent sintering of the catalyst metal and entry into solid solution with the ceria powder.

Japanese Patent Publication (A) No. 2002-346387 discloses an exhaust gas purification catalyst arranging an intermediate layer on a carrier and making this intermediate layer carry a nitrogen oxide-removing catalyst comprised of a composite of perovskite-type composite oxide particles and platinum or other precious metal particles. Here, this intermediate layer is formed from a material having affinity with both the nitrogen oxide-removing catalyst and carrier and not causing the nitrogen oxide-removing catalyst component to change much, for example, zirconia, ceria oxide, barium oxide, titania, or a rare earth oxide. Japanese Patent Publication (A) No. 2002-346387 states that this intermediate layer can prevent sintering of the nitrogen oxide-removing catalyst and keep the nitrogen oxide-removing catalyst from reacting with the carrier and being changed.

Further, Japanese Patent Publication (A) No. 9-141098, Japanese Patent Publication (A) No. 4-284847, and Japanese Patent Publication (A) No. 2001-314763 disclose to improve the heat resistance of a catalyst using a zirconia-based catalyst carrier by adding to the zirconia an alkali earth metal, a rare earth, or other stabilization element so as to improve the zirconia's BET ratio surface area, heat stability, etc.

DISCLOSURE OF THE INVENTION

As described in the above Japanese Patent Publication (A) No. 4-180835, if making ceria carry platinum or other precious metal catalyst particles, the interaction of the two causes the precious metal catalyst particles to be fixed on the carrier. However, ceria has a so-called oxygen storage capability (OSC) of storing oxygen in an oxidizing atmosphere and releasing oxygen in a reducing atmosphere. Therefore, ceria releases oxygen in a reducing atmosphere and changes in atomic valence from 4 to 3, so drops in interaction with precious metal particles. Therefore, in a reducing atmosphere, the sintering inhibiting effect on the precious metal particles may fall or sintering may end up being promoted.

According to the catalyst described in the above Japanese Patent Publication (A) No. 2002-346387, it is possible to prevent sintering of nitrogen oxide-removing catalyst particles. However, in the catalyst of this Japanese Patent Publication (A) No. 2002-346387, it is necessary make the nitrogen oxide-removing catalyst particles a mixture of a perovskite-type composite oxide and precious metal particles. Further, it is necessary to provide the above intermediate layer, so the configuration becomes complicated. Further, when carrying the precious metal particles alone, there is a possibility that the sintering may not necessarily be able to be prevented or inhibited.

As described in Japanese Patent Publication (A) No. 9-141098, Japanese Patent Publication (A) No. 4-284847, and Japanese Patent Publication (A) No. 2001-314763, it is possible to add to zirconia an alkali earth metal, a rare earth, or another stabilization element to improve zirconia's BET ratio surface area, heat stability, etc. However, these stabilized zirconia carriers were not sufficient in prevention of sintering of the precious metal particles carried, in particular platinum and palladium particles.

The present invention was made taking note of the above technical problem and has as its object the provision of a catalyst carrier able to prevent sintering of the metal catalyst particles carried and an exhaust gas purification catalyst using the carrier.

The precious metal carrying use catalyst carrier of the present invention comprises a composite oxide of an electron accepting element, having an electron accepting property of accepting electrons from a precious metal element of precious metal catalyst particles by the approach or contact with the precious metal element and not changing in atomic valence by an oxidation reduction reaction, and another element.

In the catalyst carrier of the present invention, the electron accepting element can be selected from a group comprised of lanthanum, neodymium, yttrium, magnesium, and combinations of the same, in particular the group comprised of lanthanum, neodymium, and combinations of the same.

In the catalyst carrier of the present invention, the "other element" may be selected from a group comprised of silicon, aluminum, zirconium, titanium, and combinations of the same, in particular the group comprised of silicon, titanium, and combinations of the same.

In the catalyst carrier of the present invention, the composite oxide may have an electronegativity of 2.55 to 2.80.

In the catalyst carrier of the present invention, a molar ratio of the electron accepting element to a total of the electron accepting element and other element may be 0.3 or more.

In one aspect of the catalyst carrier of the present invention, the electron accepting element is selected from a group comprising lanthanum, neodymium, yttrium, magnesium, and combinations of the same, the other element is selected from a group comprising silicon, aluminum, zirconium, titanium, and combinations of the same, and a molar ratio of the electron accepting element to a total of the electron accepting element and other element is 0.3 or more.

Further, in one aspect of the catalyst carrier of the present invention, the electron accepting element is selected from a group comprising lanthanum, neodymium, yttrium, and combinations of the same, the other element is silicon, and a molar ratio of the electron accepting element to a total of the electron accepting element and other element is 0.5 to 0.7. In particular, in this aspect of the catalyst carrier of the present invention, the electron accepting element is lanthanum, the other element is silicon, and the molar ratio of the lanthanum to the total of the lanthanum and silicon (La/(La+Si)) is 0.5 to 0.7.

Still further, in one aspect of the catalyst carrier of the present invention, the electron accepting element is selected from a group comprising lanthanum, neodymium, yttrium, magnesium, and combinations of the same, the other element is selected from a group comprising zirconium, titanium, and combinations of the same, and a molar ratio of the electron accepting element to a total of the electron accepting element and other element is 0.3 to 0.7. In particular, in this aspect of the catalyst carrier of the present invention, the electron accepting element is neodymium, the other element is zirconium, and the molar ratio of the neodymium to the total of the neodymium and zirconium (Nd/(Nd+Zr)) is 0.3 to 0.7.

In the catalyst carrier of the present invention, the composite oxide may be carried on other carrier particles with a relatively higher heat resistance than this composite oxide.

The exhaust gas purification catalyst of the present invention is comprised of the catalyst carrier of the present invention on which precious metal catalyst particles are carried.

Here, these precious metal catalyst particles in particular may be selected from a group comprising platinum, palladium, and combinations of the same.

Method of Present Invention for Producing Catalyst Carrier

The method of the present invention for producing the catalyst carrier of the present invention comprises providing a dispersion made of a hydrophobic solvent phase in which a water soluble phase is dispersed; hydrolyzing a salt of an electron accepting element and a salt of another element in the water soluble phase dispersed in the dispersion to cause a metal oxide precursor to precipitate and making this metal oxide precursor coagulate; and drying and firing the coagulated metal oxide precursor.

The catalyst carrier of the present invention is comprised of a composite oxide of an electron accepting element and another element, so when this catalyst carrier is made to carry the precious metal catalyst particles, the electrons of the precious metal element are positioned at the composite oxide forming the carrier and the two bond. Furthermore, in the catalyst carrier of the present invention, the atomic valence of the electron accepting element does not change in an oxidation reduction reaction, so the bonded state of the composite oxide and the precious metal element does not particularly change. For this reason, even if the exhaust gas changes to an oxidizing atmosphere or a reducing atmosphere, the state of the precious metal catalyst particles firmly fixed to the carrier will be maintained and as a result, movement of the precious metal catalyst particles or sintering caused by the same can be prevented or inhibited.

BEST MODE FOR CARRYING OUT THE INVENTION

The catalyst carrier of the present invention is one for carrying precious metal catalyst particles and is comprised of a composite oxide. Here, this composite oxide is comprised of an electron accepting element having an electron accepting property of accepting electrons from the precious metal element forming the catalyst particles and not changing in atomic value by an oxidation reduction reaction and of another element.

Figure 1:
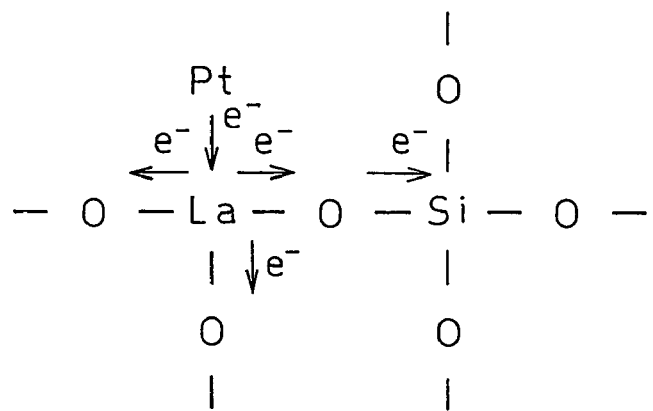
FIG. 1 is a view conceptually showing mechanism of the catalyst carrier of the present invention.

In the catalyst carrier of the present invention, it is believed that the precious metal element supplies electrons to the electron accepting element in a coordinate bonding fashion for bonding with the carrier and the precious metal element is fixed on the carrier by the mechanism shown in FIG. 1 relating to the lanthanum (La) as the electron accepting element and silicon (Si) as the other element. Further, according to XPS analysis after $H_2$ reduction at 400° C., the platinum is oxidized regardless of being after reduction, whereby results supporting this mechanism were obtained.

In particular, as shown in this FIG. 1, when the other element is an element like silicon (Si) with a large electronegativity as a metal oxide, electrons are strongly pulled from an electron accepting element like lanthanum (La) and therefore the effect of stabilization of La ions becomes larger.

Further, regarding the present invention, the "electronegativity as a metal oxide" is the value of the electroconductivity due to the Pauling values of the metal element and oxygen forming the metal oxide averaged weighted by the ratio of these elements contained in the metal oxide. That is, for example, the electronegativity of silica ($SiO_2$) as a metal oxide is calculated as follows:

$$\{1.90(\text{silicon electronegativity}) \times 1 + 3.44(\text{oxygen electronegativity}) \times 2\}/3 \approx 2.93$$

For reference, the electronegativity as a metal oxide is shown in the following Table 1 for several metals:

TABLE 1

Electronegativity of Metal Oxides

| Oxide | Electronegativity |
|---|---|
| BaO | 2.17 |
| $La_2O_3$ | 2.50 |
| $Nd_2O_3$ | 2.52 |
| $Al_2O_3$ | 2.71 |
| $ZrO_2$ | 2.74 |
| $TiO_2$ | 2.81 |
| $SiO_2$ | 2.93 |

Electron Accepting Element

The electron accepting element forms the composite oxide together with the other element. This electron accepting element is selected as an element which, when combined with the other element to form the composite oxide, has an electron accepting property of accepting electrons from the precious metal element by the approach or contact of the precious metal catalyst particles and does not change in atomic valence in an oxidation reduction reaction.

In particular, the electron accepting element is at least one type of alkali earth metal or rare earth element. Specifically, the electron accepting element is an element for example selected from a group comprising lanthanum, neodymium, yttrium, magnesium, and combinations of the same.

More particularly, the electron accepting element is an element forming ions of a rare earth element with younger atomic numbers among the typical elements and with space in the 4f orbit (much space). Therefore, the preferable electron accepting element is an element selected from a group comprising lanthanum (La), neodymium (Nd), and combinations of the same.

As explained above, in the present invention, it is intended that the precious metal catalyst particles be carried or fixed at the composite oxide forming the carrier. However, the environment in which the catalyst is placed may change to both an oxidizing atmosphere and reducing atmosphere. Therefore, to make the precious metal catalyst particles be stably carried in either atmosphere, in the catalyst carrier of the present invention, an element not changing in atomic valence in an oxidation reduction reaction is used as the electron accepting element. On this point, the catalyst carrier of the present invention differs from the conventional catalyst carrier using ceria.

Other Element

The electron accepting element is not used alone. It is used as a composite oxide with another element, in particular, another metal element. This is so as to raise the heat resistance and, also, weaken the basicity of the electron accepting element to make the composite oxide as a whole neutral or close to neutral. Therefore, that other element may be a metal element conventionally used as a carrier or base material of an exhaust gas catalyst. Specifically, it may be selected from a group comprising silicon (Si), aluminum (Al), zirconium (Zr), titanium (Ti), and combinations of the same.

As explained above, when the other element is an element like silicon (Si) with a large electronegativity as a metal oxide, electrons are strongly pulled from the lanthanum (La) or other such electron accepting element, whereby bonding in a coordinate bonding fashion is promoted between the precious metal element and the electron accepting element. Therefore, preferably the other element is selected from a group comprising silicon (Si), titanium (Ti), and combinations of the same.

Electronegativity of Composite Oxide

The composite oxide forming the catalyst carrier of the present invention has an electronegativity of preferably 2.55 to 2.80, more preferably 2.60 to 2.73. According to this electronegativity, it is possible to maintain the catalyst activity in a good state by a suitable acidity/basicity.

Here, the "electronegativity of a composite oxide", like in the case of the electronegativity as the above metal oxide, means the weighted average of the Pauling values for the different elements forming the composite oxide. There is also the method of finding the electronegativity stoichiochemically, but due to the techniques and conditions set etc., clear values cannot be obtained, so in the present invention, the simple weighted average is employed.

The composite oxide used in the present invention is neutral or close to neutral. If the electronegativity is outside the above range, the sintering inhibiting effect of the precious metal catalyst particles is reduced.

Further, for the present invention, the electronegativity of oxygen used for calculation of the electronegativity of the metal oxide is 3.44. Further, the electronegativities of the electron accepting elements and other elements able to be used in the present invention are as follows:

Electron accepting element: La (1.10), Nd (1.14), Y (1.22), Mg (1.31).

Other element: Si (1.90), Al (1.61), Zr (1.33), Ti (1.54).

Further, in a catalyst carrier for an exhaust gas purification catalyst, it may be considered, using alumina ($Al_2O_3$, electronegativity: 2.71) as the standard, that any metal oxide with an electronegativity larger than alumina is acidic and further that any metal oxide with an electronegativity smaller than alumina is basic.

In general, when the catalyst carrier for the exhaust gas purification catalyst is strongly basic, hydrocarbons (HC) have a hard time being adsorbed at the carrier and therefore the oxidizing performance of HC tends to become lower. Further, in this case, in a lean atmosphere where the oxygen is in excess, oxygen is adsorbed at the catalyst carrier whereby the platinum or other precious metal carried on this catalyst carrier is oxygen poisoned and as a result the catalyst activity sometimes falls. On the other hand, when the catalyst carrier for an exhaust gas purification catalyst is strongly acidic, electrons are drawn from the precious metal carried on it whereby the reduction reaction of the $NO_x$ on the precious metal is inhibited.

Therefore, the catalyst carrier for an exhaust gas purification catalyst preferably has a relatively neutral electronegativity similar to alumina. In relation to this, the electronegativity of a composite metal oxide is shown in the following Table 2 for the ratio of silica ($SiO_2$) as the acidic metal oxide and lanthanum oxide ($La_2O_3$) as the basic metal oxide. Further, the electronegativity of alumina ($Al_2O_3$) is 2.71.

TABLE 2

Electronegativity of Lanthanum Oxide-Silica Composite Oxide

| Ratio of lanthanum oxide ($La_2O_3$) | Ratio of silica ($SiO_2$) | Electronegativity |
|---|---|---|
| 0.0 | 1.0 | 2.93 |
| 0.1 | 0.9 | 2.89 |
| 0.2 | 0.8 | 2.84 |
| 0.3 | 0.7 | 2.80 |
| 0.4 | 0.6 | 2.76 |
| 0.5 | 0.5 | 2.72 |
| 0.6 | 0.4 | 2.67 |
| 0.7 | 0.3 | 2.63 |

TABLE 2-continued

Electronegativity of Lanthanum Oxide-Silica
Composite Oxide

| Ratio of lanthanum oxide (La$_2$O$_3$) | Ratio of silica (SiO$_2$) | Electronegativity |
|---|---|---|
| 0.8 | 0.2 | 2.59 |
| 0.9 | 0.1 | 2.54 |
| 1.0 | 0.0 | 2.50 |

Molar Ratio of Electron Accepting Element

When adding neodymium, lanthanum, or another element to an oxide of zirconium or another element, when the molar ratio of the electron accepting element with respect to the total of the neodymium or other element and of the other element is 0.01 to 0.3 or so, it is known that generally the neodymium or other element enables the oxide of the other element to be stabilized and the heat resistance as the catalyst carrier to be improved.

However, the present inventors etc. unexpectedly discovered that when the molar ratio of the neodymium or other element is large, for example, is 0.3 or more, in particular 0.4 or more, the carrier falls in heat resistance, whereby even if the carrier surface area is reduced, the affinity between the neodymium or other element and the precious metal enables sintering of the precious metal carried on the carrier to be prevented.

Therefore, for example, in the catalyst carrier of the present invention, the electron accepting element is selected from a group comprising lanthanum, neodymium, yttrium, magnesium, and combinations of the same, the other element is selected from a group comprising silicon, aluminum, zirconium, titanium, and combinations of the same, and a molar ratio of the electron accepting element to a total of the electron accepting element and other element is 0.3 or more, in particular 0.4 or more.

Further, in the catalyst carrier of the present invention, the composite oxide forming the catalyst carrier may be used to form an apatite-type composite oxide and stabilize the catalyst carrier.

Figure 2:
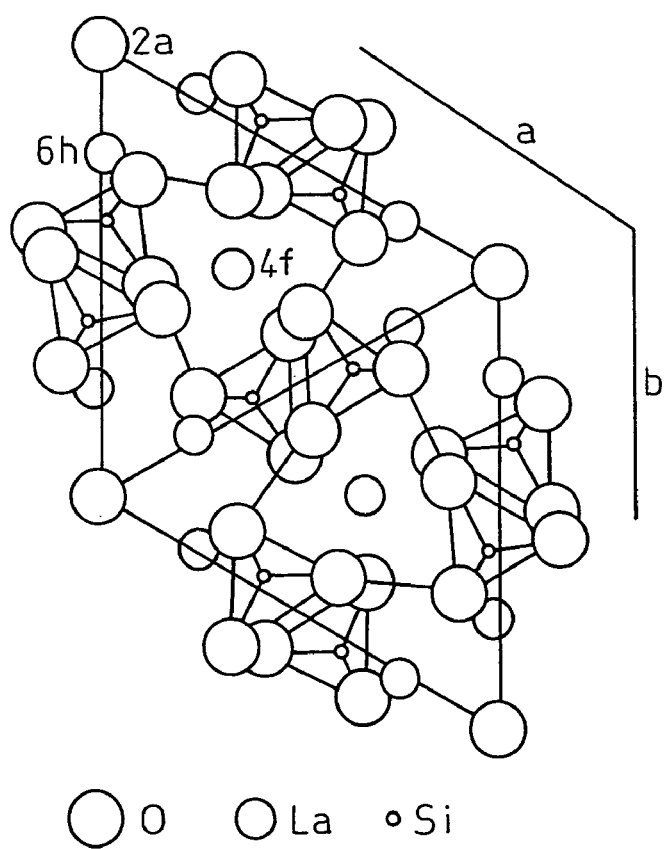
FIG. 2 is a view showing a crystal structure of an apatite type composite oxide of a composition of $LaSiO_x$.

By way of reference, the crystal structure of an apatite-type composite oxide of composition of LaSiO$_x$ fired at 1,500° C. is taken from S. Nakayama, T. Kageyama, H. Aono, and Y. Sadaoka, *J. Mater. Chem.*, 5, 1801-1805 (1995) and shown in FIG. 2. As will be understood from this FIG. 2, when using an apatite type composite oxide as the composite oxide forming the catalyst carrier of the present invention, a state results where the precious metal particles relatively easily approach the lanthanum or other electron accepting element, whereby sintering of precious metal particles is particularly inhibited.

When using an apatite type composite oxide, for example, in the catalyst carrier of the present invention, the electron accepting element is selected from a group comprising lanthanum, neodymium, yttrium, and combinations of the same, the other element is silicon, and a molar ratio of the electron accepting element to a total of the electron accepting element and other element is 0.5 to 0.7. Further, in this case, in particular, in the catalyst carrier, the electron accepting element is lanthanum, the other element is silicon, and the molar ratio of the lanthanum to the total of the lanthanum and silicon (La/(La+Si)) is 0.5 to 0.7.

Further, with the catalyst carrier of the present invention, the composite oxide forming the catalyst carrier may be made a pyrochlore-type or perovskite-type composite oxide so as to stabilize the catalyst carrier.

In this case, in the catalyst carrier of the present invention, the electron accepting element is selected from a group comprising lanthanum, neodymium, yttrium, magnesium, and combinations of the same, the other element is selected from a group comprising aluminum, zirconium, titanium, and combinations of the same, and a molar ratio of the electron accepting element to a total of the electron accepting element and other element is 0.3 to 0.7. Further, in this case in particular, in the catalyst carrier of the present invention, the electron accepting element is neodymium, the other element is zirconium, and the molar ratio of the neodymium to the total of the neodymium and zirconium (Nd/(Nd+Zr)) is 0.3 to 0.7.

Form of Composite Oxide

In the catalyst carrier of the present invention, the composite oxide of the electron accepting element and the other metal may be used formed in particles.

Further, this composite oxide can be made to be carried on other carrier particles with a relatively higher heat resistance than this composite oxide. According to this, even when formed into an exhaust gas purification catalyst or the like and exposed to a high temperature, the structure of the above composite oxide can be easily maintained and the results and the heat resistance can be further improved.

Exhaust Gas Purification Catalyst

The above carrier is made to carry a precious metal catalyst, whereby the exhaust gas purification catalyst of the present invention is obtained. This precious metal catalyst specifically may be a precious metal selected from a group comprising platinum (Pt), rhodium (Rh), palladium (Pd), and combinations of the same, in particular, may be a precious metal selected from a group comprising platinum particles, with a relatively large tendency to sinter during use as an exhaust gas purification catalyst, palladium, and combinations of the same. To carry a precious metal, a conventionally known impregnation method (slurry method), dipping method, etc. may be used.

According to the exhaust gas purification catalyst of the present invention, it is possible to prevent sintering of precious metal catalyst particles and obtain a catalyst superior in exhaust gas purification ability over a long period of time.

Method of Present Invention of Producing Catalyst Carrier

The method of the present invention for producing the catalyst carrier of the present invention includes providing a dispersion made of a hydrophobic solvent phase in which a water soluble phase is dispersed; hydrolyzing a salt of an electron accepting element and a salt of another element in the water soluble phase dispersed in the dispersion to cause a metal oxide precursor to precipitate and making this metal oxide precursor coagulate; and drying and firing the coagulated metal oxide precursor.

According to the method of the present invention, by making a metal oxide precursor containing an electron accepting element and another element precipitate in fine water droplets, it is possible to obtain a metal oxide precursor in which precursors of an oxide of the electron accepting element and oxide of the other element are dispersed in a high degree. Therefore according to the method of the present invention, the catalyst carrier of the present invention can be obtained.

With the method of the present invention for producing the catalyst carrier of the present invention, for the first time there is provided a dispersion in which a water soluble phase is dispersed in a hydrophobic solvent phase by the general use of a surfactant, in particular, a microemulsion with a size of droplets of the water soluble phase of 2 to 100 nm, preferably 2 to 50 nm, more preferably 2 to 40 nm.

As the hydrophobic solvent able to be used here, a hydrocarbon such as cyclohexane or benzene, a straight chain alcohol such as hexanol, and a ketone such as acetone may be used.

Further, the surfactant able to be used for obtaining the dispersion provided here may be any of a nonionic surfactant, an anionic surfactant, or a cationic surfactant and may be selected in combination with the hydrophobic solvent.

As the nonionic surfactant, a polyoxyethylene (n=5) nonylphenyl ether or polyoxyethylene (n=10) octylphenyl ether or another such polyoxyethylene alkylphenyl ether based or polyoxyethylene (n=7) cetyl ether or another polyoxyethylene alkyl ether based surfactant may be mentioned. Further, as an anionic surfactant, sodium di-2-ethylene hexylsulfosuccinate etc. may be mentioned, while as a cationic surfactant, cetyl trimethyl ammonium chloride, cetyl trimethyl ammonium bromide, etc. may be mentioned.

In the method of the present invention of producing the catalyst carrier of the present invention, next a salt of the electron accepting element and a salt of the other element are hydrolyzed in the water-soluble phase dispersed in the dispersion obtained in the above way to cause the metal oxide precursor to precipitate and cause the metal oxide precursor to coagulate.

Here, to make the metal oxide precursor precipitate in water droplets, it is possible to add ammonia water, a sodium hydroxide aqueous solution, or another basic solution to the dispersion so as to make the dispersion relatively basic in property and hydrolyze the salt of the electron accepting element etc. In general, the use of ammonia water is preferable in the point of ease of removal.

As the salt of the electron accepting element and the salt of the other element used here, it is possible to use any salt having a water soluble property. For example, it is possible to use a nitrate, chloride, or other such inorganic acid salt or an acetate, lactate, oxalate, or other such organic acid salt, in particular a nitrate.

Further, when further including an oxide of another component in a composite oxide of an electron accepting element and other element, it is possible to hydrolyze the salt of the metal forming this metal oxide in the water soluble phase together with the salt of the electron accepting element etc.

In the method of the present invention of producing the catalyst carrier of the present invention, finally the above coagulated metal oxide precursor is dried and fired.

The drying and firing of the metal oxide precursor may be performed by any temperature enabling a composite oxide of a salt of an electron accepting element and other element to be obtained. This for example may be performed by placing a metal oxide precursor into a 120° C. oven for drying, then firing this dried metal oxide precursor at a temperature generally used in synthesis of a metal oxide, for example, a temperature of 500 to 1100° C.

Below, examples and comparative examples will be used to explain the present invention. However, these examples and comparative examples do not limit the present invention in any way.

EXAMPLES

Example 1

Synthesis of Lanthanum Oxide-Silica Composite Oxide Catalyst Carrier of Present Invention The inventors proceeded as follows using the microemulsion method to synthesize a $La_{10}Si_6O_{27}$ composition lanthanum oxide-silica composite oxide catalyst carrier.

First, as the lanthanum (La) source, the inventors mixed a mixed aqueous solution 180 ml of a lanthanum nitrate aqueous solution (0.3016 mol, concentration 1.675M) and ammonia water (0.3748 mol, concentration 2.082M) together with 2-butanol 22.6 ml into a solvent of an alkyl-based surfactant BC-5.5 (tradename) 456.9 g dissolved in cyclohexane 6485 ml so as to prepare a microemulsion solution. On the other hand, as the silicon (Si) source, they prepared an alkoxide solution of tetraethoxysilane (TEOS) 0.1809 mol dissolved in cyclohexane 1000 ml.

To the microemulsion solution serving as the lanthanum source, they mixed the alkoxide solution serving as the silicon source and added concentration 14.8M ammonia water 79.85 ml and distilled water 7.69 ml. The ratio of the organic solvent and surfactant (O/S) in this state was 63.6, the ratio of the oil phase and the aqueous phase (O/W) was 6, the assumed diameter (dw) of the micelles was 40 nm, and the pH was 8.1. Further, the mixing time was 5 minutes. As a result, hydrolysis occurred, primary particles of the precursor of the lanthanum oxide-silica composite oxide were formed, and, further, the primary particles coagulated and secondary particles were formed.

Next, they added ethanol 300 ml, concentration 14.8M ammonia water 192.82 ml, and distilled water 18.57 ml to bring the microemulsion solution to a two-phase region which was stirred to make the secondary particles further coagulate for maturing. The pH at this time was 10.0, the ratio of the aqueous phase and the surfactant (W/S) was 34.2, and the duration was 60 minutes.

After this, they took out the coagulate, cleaned if of the deposited surfactant by alcohol, and dried and fired it accordance with ordinary methods to obtain a catalyst carrier comprised of a lanthanum oxide-silica composite oxide ($La_{10}Si_6O_{27}$).

Synthesis of Neodymium Oxide-Zirconia Composite Oxide Catalyst Carrier of Present Invention The inventors proceeded as follows using the microemulsion method to synthesize an $NdZrO_{3.5}$ composition neodymium oxide-zirconia composite oxide catalyst carrier.

As the neodymium (Nd) source, the inventors mixed an aqueous solution 120 ml of a concentration 0.1144M zirconium oxynitrate 0.0137 ml, concentration 1.144M neodymium nitrate 0.1372 ml, and concentration 2.093M ammonia water 0.2511 mol together with 2-butanol 45.2 ml into a solvent of an alkyl-based surfactant BC-5.5 (tradename) 304.6 g dissolved in cyclohexane 4323 ml to prepare a microemulsion solution. On the other hand, as the zirconium (Zr) source, they prepared an alkoxide solution of 111 ml of a cyclohexane solution into which 0.0124 mol of zirconium-2-butyrate was dissolved.

To the microemulsion solution serving as the neodymium source, they mixed the alkoxide solution serving as the zirconium source. In this state, the ratio of the organic solvent and surfactant (O/S) was 63.6, the ratio of the oil phase and aqueous phase (O/W) was 6, and the predicted diameter (dw) of the micelles was 47 nm. Further, the mixing time was 30 seconds.

Further, to cause the formation of primary particles and secondary particles of these coagulated, they added concentration 14.8M ammonia water 39.85 ml and an alkoxide solution of 1000 ml of a cyclohexane solution into which 0.1112 mol of zirconium-2-butyrate was dissolved. In this state, the pH was 8.1 and the mixing time was 1 minute. Further, they added concentration 14.8M dilute ammonia water 104.2 ml and distilled water 121 ml to bring the microemulsion solution to a two-phase region which was stirred to further cause the secondary particles to coagulate for maturing. The pH at this time was 10.0, the ratio of the aqueous phase and surfactant (W/S) was 34.2, and the duration was 60 minutes.

After this, they took out the coagulate, cleaned if of the deposited surfactant by alcohol, and dried and fired it accordance with ordinary methods to obtain a catalyst carrier comprised of a neodymium oxide-zirconia composite oxide (NdZrO$_{3.5}$).

Synthesis of Yttrium Oxide-Silica Composite Oxide Catalyst Carrier of Present Invention The inventors proceeded as follows using the microemulsion method to synthesize a Y$_{10}$Si$_6$O$_{27}$ composition yttrium oxide-silica composite oxide catalyst carrier in an amount of 20 g.

First, as the yttrium (Y) source, the inventors mixed a mixed aqueous solution (150 ml) (nitric acid ions: 0.604 mol, 4.028M) of a yttrium oxide aqueous solution (0.2014 mol, concentration 1.343M) and an ammonium nitrate solution (0.163 mol, concentration 2.776M) in a solvent of an alkyl-based surfactant polyoxyethylene (n=5.5) cetyl ether (BC-5.5 (tradename)) 171.3 g dissolved in cyclohexane 2432 ml to prepare a microemulsion solution. On the other hand, as the silicon (Si) source, they prepared an alkoxide solution of tetraethoxysilane (TEOS) 0.120841 mol dissolved in cyclohexane 1000 ml.

To the microemulsion solution serving as the yttrium source, the inventors mixed the alkoxide solution serving as the silicon source and added concentration 14.8M ammonia water 32.66 ml and distilled water 3.15 ml. In this state, the ratio of the organic solvent and surfactant (O/S) was 63.6, and the pH was 7.2. Further, the mixing time was 5 minutes. As a result, hydrolysis occurred, primary particles of a precursor of yttrium oxide-silica composite oxide were formed, and, further, the primary particles coagulated to form secondary particles.

Next, the inventors added distilled water 230.0 ml, ethanol 200.0 ml, and concentration 14.8M ammonia water 8.16 ml to bring the microemulsion solution to a two-phase region which was stirred to cause the secondary particles to further coagulate for maturing. The pH at this time was 8.8, the ratio of the aqueous phase and surfactant (W/S) was 34.2, and the duration was 60 minutes.

After this, they took out the coagulate, washed it three times, dried and calcined it, then fired it further at 800° C. over 2 hours to obtain a catalyst carrier comprised of a yttrium oxide-silica composite oxide (Y$_{10}$Si$_6$O$_{27}$).

Synthesis of Magnesium Oxide-Silica Composite Oxide Catalyst Carrier of Present Invention The inventors proceeded as follows using the microemulsion method to synthesize an MgSiO$_3$ composition magnesium oxide-silica composite oxide catalyst carrier in an amount of 30 g.

First, as the magnesium (Mg) source, the inventors mixed a mixed aqueous solution (90 ml) (nitric acid ions: 0.848 mol, 9.417M) of a magnesium nitrate aqueous solution (0.298827 mol, concentration 3.3203M) and an ammonium nitrate solution (0.2499 mol, concentration 2.776M) in a solvent of an alkyl-based surfactant polyoxyethylene (n≈5.5) cetyl ether (BC-5.5 (tradename)) 251.3 g dissolved in cyclohexane 4323 ml to prepare a microemulsion solution. On the other hand, as the silicon (Si) source, they prepared an alkoxide solution of tetraethoxysilane (TEOS) 0.298827 mol dissolved in cyclohexane 1000 ml.

To the microemulsion solution serving as the magnesium source, the inventors mixed the alkoxide solution serving as the silicon source and added concentration 14.8M ammonia water 40.33 ml and distilled water 3.88 ml. In this state, the ratio of the organic solvent and surfactant (O/S) was 90, the ratio of the oil phase and aqueous phase (O/W) was 6, and the pH was 7.8. Further, the mixing time was 5 min. As a result, hydrolysis occurred, primary particles of a precursor of magnesium oxide-silica composite oxide were formed, and, further, the primary particles coagulated to form secondary particles.

Next, the inventors added distilled water 230.0 ml and ethanol 200.0 ml to bring the microemulsion solution to a two-phase region which was stirred to make the secondary particles further coagulate for maturing. The pH at this time was 7.8, the ratio of the aqueous phase and surfactant (W/S) was 34.2, and the duration was 60 min.

After this, they took out the coagulate, washed it three times, dried and calcined it, then fired it further at 800° C. over 2 hours to obtain a catalyst carrier comprised of a magnesium oxide-silica composite oxide (MgSiO$_3$).

Synthesis of Lanthanum Oxide-Titania Composite Oxide Catalyst Carrier of Present Invention The inventors proceeded as follows using the microemulsion method to synthesize an LaTiO$_{3.5}$ composition pyrochlore structure lanthanum oxide-titania composite oxide catalyst carrier in an amount of 30 g.

As the lanthanum (La) source, the inventors mixed a mixed aqueous solution of a lanthanum nitrate aqueous solution (0.0824 mol, 1.030M) 80 ml and an antistatic promoter comprised of 0.18M choline chloride 3.016 ml into a solvent of an alkyl-based surfactant BC-5.5 (tradename) 104.5 g dissolved in cyclohexane 2594 ml to prepare a microemulsion solution. On the other hand, as the titanium (Ti) source, they prepared an alkoxide solution of cyclohexane 1000 ml into which 0.0824 mol of titanium-butyrate was dissolved.

To the above microemulsion solution, to cause the formation of primary particles and secondary particles of these coagulated, the inventors added concentration 13.5M ammonia water 66.57 ml, 35% alkyl ammonium 4.27 ml, and an alkoxide solution of cyclohexane solution 1000 ml into which 0.0824 mol of titanium butyrate was dissolved. In this state, the pH was 10.0. Further, the mixing time was 5 min. Further, the inventors added distilled water 230.0 ml and ethanol 200 ml to change the ratio of the aqueous phase and surfactant (W/S) and bring the microemulsion solution to a two-phase region which was stirred to cause the secondary particles to further coagulate for maturing. The pH at this time was 10.0, and the duration was 5 min.

After this, they took out the coagulate, cleaned if of the deposited surfactant by alcohol, and dried and fired it accordance with ordinary methods to obtain a catalyst carrier comprised of a lanthanum oxide-titania composite oxide (LaTiO$_{3.5}$).

Synthesis of Other Composite Oxide Catalyst Carriers of Present Invention

In the same way as the above, the microemulsion method was used to synthesize a neodymium oxide-silica composite oxide (Nd$_{10}$Si$_6$O$_{27}$) catalyst carrier, a lanthanum oxide-alumina composite oxide (LaAlO$_3$) catalyst carrier, a neodymium oxide-alumina composite oxide (NdAlO$_3$) catalyst carrier, a lanthanum oxide-zirconia composite oxide (LaZrO$_{3.5}$) catalyst carrier, a magnesium oxide-alumina composite oxide (MgAlO$_{2.5}$) catalyst carrier, a yttrium oxide-zirconia composite oxide (YZrO$_{3.5}$) catalyst carrier, a neodymium oxide-titania composite oxide (NdTiO$_{3.5}$) catalyst carrier, and a yttrium oxide-titania composite oxide (YTiO$_{3.5}$) catalyst carrier of the present invention.

Prior Art Catalyst Carriers

As prior art catalyst carriers, La$_2$O$_3$, Al$_2$O$_3$, ZrO$_2$, TiO$_2$, and SiO$_2$ were obtained.

Evaluation

The electronegativity was found for the catalyst carriers of the present invention and prior art. Further, these catalyst carriers were made to carry 1 wt % of platinum particles in accordance with an ordinary method, were fired in the air at 800° C. for 2 hours, then were measured for particle size of the platinum particles. These measurement results are shown in the following Table 3.

TABLE 3

Results of Evaluation

| | Ratio of electron accepting element | Electronegativity | Pt particle size (nm) |
|---|---|---|---|
| $La_2O_3$ (conventional) | 1.000 | 2.50 | 37.3 |
| Alumina-based | | | |
| $MgAlO_{2.5}$ (invention) | 0.500 | 2.56 | 48.9 |
| $LaAlO_3$ (invention) | 0.500 | 2.61 | 18.5 |
| $NdAlO_3$ (invention) | 0.500 | 2.61 | 12.7 |
| $Al_2O_3$ (conventional) | 0.000 | 2.71 | 50.2 |
| Zirconia-based | | | |
| $LaZrO_{3.5}$ (invention) | 0.500 | 2.63 | 15.1 |
| $NdZrO_{3.5}$ (invention) | 0.500 | 2.64 | 5.5 |
| $YZrO_{3.5}$ (invention) | 0.500 | 2.65 | 28.6 |
| $ZrO_3$ (conventional) | 0.000 | 2.75 | 68.2 |
| Silica based | | | |
| $MgSiO_3$ (invention) | 0.500 | 2.71 | 18.3 |
| $La_{10}Si_6O_{27}$ (invention) | 0.625 | 2.68 | 5.4 |
| $Nd_{10}Si_6O_{27}$ (invention) | 0.625 | 2.69 | 14.0 |
| $Y_{10}Si_6O_{27}$ (invention) | 0.625 | 2.71 | 7.5 |
| $SiO_2$ (conventional) | 0.000 | 2.93 | 99.1 |
| Titania based | | | |
| $LaTiO_{3.5}$ (invention) | 0.500 | 2.67 | 15.0 |
| $NdTiO_{3.5}$ (invention) | 0.500 | 2.68 | 14.5 |
| $YTiO_{3.5}$ (invention) | 0.500 | 2.69 | 46.3 |
| $TiO_2$ (conventional) | 0.000 | 2.81 | 87.1 |

As clear from Table 3, when it comes to the sintering of platinum particles, the composite oxide carrier of the present invention has a clear effect compared with the γ-alumina, zirconia, titania, and silica of the comparative examples. The sintering inhibiting effect is large in a lanthanum oxide-silica composite oxide ($La_{10}Si_6O_{27}$), neodymium oxide-zirconia composite oxide ($NdZrO_{3.5}$), and yttrium oxide-silica composite oxide ($Y_{10}Si_6O_{27}$), In each case, the electronegativity was near 2.70 or the same level as γ-alumina. In general, the further from this electronegativity of 2.70, the larger the particle size. It is believed that the strong bonds formed by positioning of precious metal electrons in the 4f-LUM0 orbits of lanthanum and neodymium achieve the inhibition of sintering.

Figure 3:
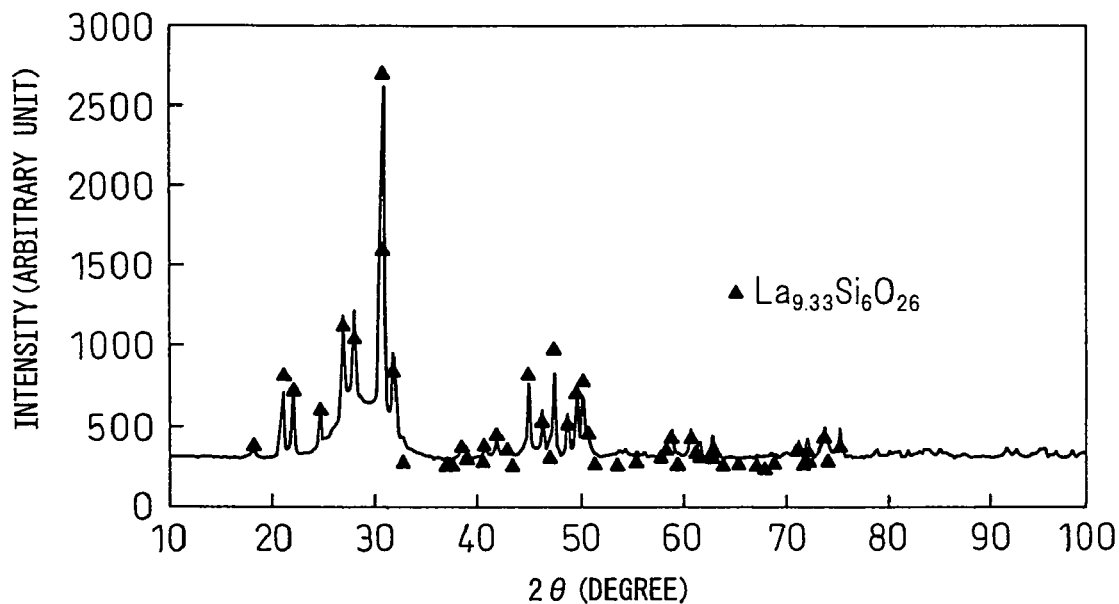
FIG. 3 is a view showing results of XRD analysis of a lanthanum oxide-silica composite oxide catalyst carrier of the present invention.

By way of reference, the results of X-ray diffraction (XRD) analysis of a lanthanum oxide-silica composite oxide (prepared composition $La_{10}Si_6O_{27}$) catalyst carrier are shown in FIG. 3.

Example 2

In this example, the effects of the composition of the composite oxide on the sintering inhibiting effect will be explained.

Figure 4:
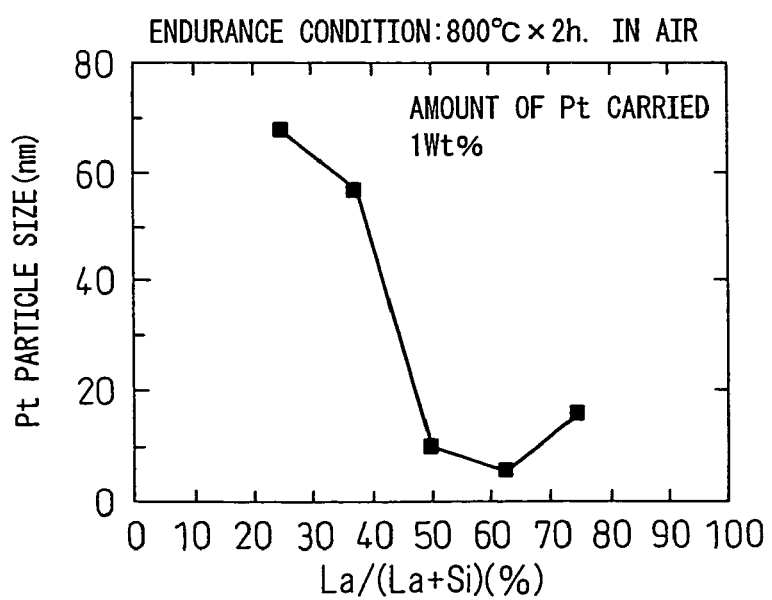
FIG. 4 is a graph showing the results of measurement of the platinum particle sintering inhibiting effect of a lanthanum oxide-silica composite oxide carrier according to the present invention.

The inventors prepared a plurality of lanthanum oxide-silica composite oxides differing in lanthanum content (La/(La+Si)), made each carry 1 wt % of platinum particles, fired each in the air at 800° C. for 2 hours, then measured each for platinum particle size. The results of evaluation of the platinum (Pt) particle size are shown in FIG. 4. As clear from FIG. 4, it is recognized that the particle size of the platinum particles is maintained small and the sintering inhibiting effect is large near a lanthanum content of 50 to 70%.

Figure 5:
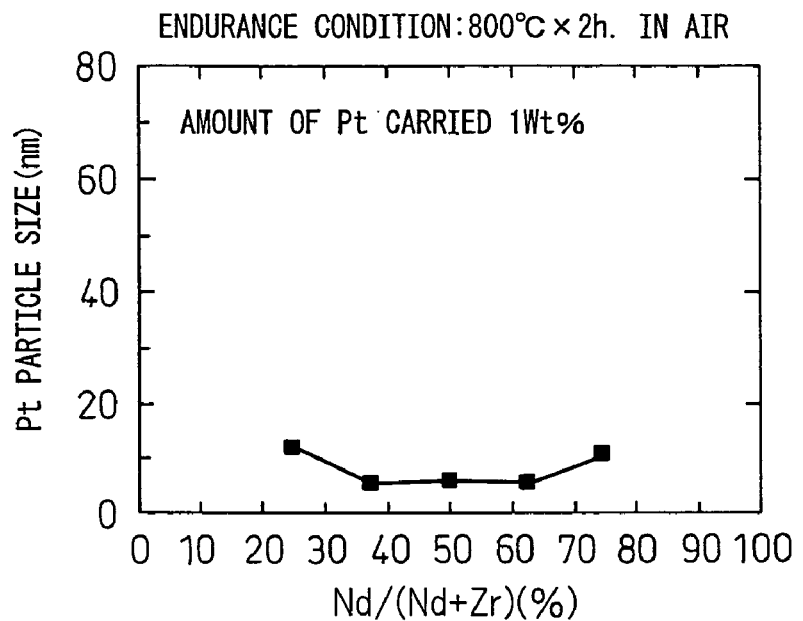
FIG. 5 is a graph showing the results of measurement of the platinum particle sintering inhibiting effect of a neodymium oxide-zirconia composite oxide carrier according to the present invention.

In the same way, the inventors investigated the effects of the neodymium content (Nd/(Nd+Zr)) for a neodymium oxide-zirconia composite oxide. The amount of the platinum particles carried and the firing conditions were made ones similar to the case of the above lanthanum oxide-silica composite oxide. The results of the evaluation of the platinum (Pt) particle size are shown in FIG. 5. As clear from FIG. 5, it was recognized that in a broad range of neodymium content of 30 to 70%, the particle size of the platinum particles is maintained small and the sintering inhibiting effect is large. Further, it was recognized that, if compared with the case of the above lanthanum oxide-silica composite oxide, even if the neodymium content is outside of the above range, there is no rapid increase in the platinum particle size and the effect of the neodymium content on the sintering inhibiting effect is relatively small.

In this way, depending on the combination of the metal elements forming the composite oxide, an effect of the composition appears with respect to the sintering inhibiting effect of the precious metal catalyst particles, so it is preferable to find the suitable composition by experiments.

Example 3

A monolith honeycomb base material was coated with the lanthanum oxide-silica composite oxide ($La_{10}Si_6O_{27}$) catalyst carrier of the present invention in an amount of 120 g/base material-L using zirconia sol, then further the base material coated with the catalyst carrier was made to carry 1.2 g/base material-L of platinum to obtain an exhaust gas purification catalyst of the present invention.

The exhaust gas purification catalyst of the present invention obtained in this way was supplied with the stoichiometric gas of the following composition at 1,000° C. for 2 hours, 10 hours, and 20 hours to test for durability. After this, the exhaust gas purification catalyst of the present invention not tested for durability and the exhaust gas purification catalyst of the present invention tested for durability were supplied with the same stoichiometric gas while raising the temperature to investigate the HC50% purification temperature (catalyst temperature when purification rate of HC reaches 50%).

TABLE 4

Stoichiometric Gas Composition

| | $N_2$ (%) | $CO_2$ (%) | NO (ppm) | CO (ppm) | $C_3H_6$ (ppmC) | $H_2$ (%) | $O_2$ (%) | $H_2O$ (%) |
|---|---|---|---|---|---|---|---|---|
| Stoichiometric gas | Bal. | 12 | 2500 | 6000 | 3000 | — | 0.4 | 10 |

Figure 6:
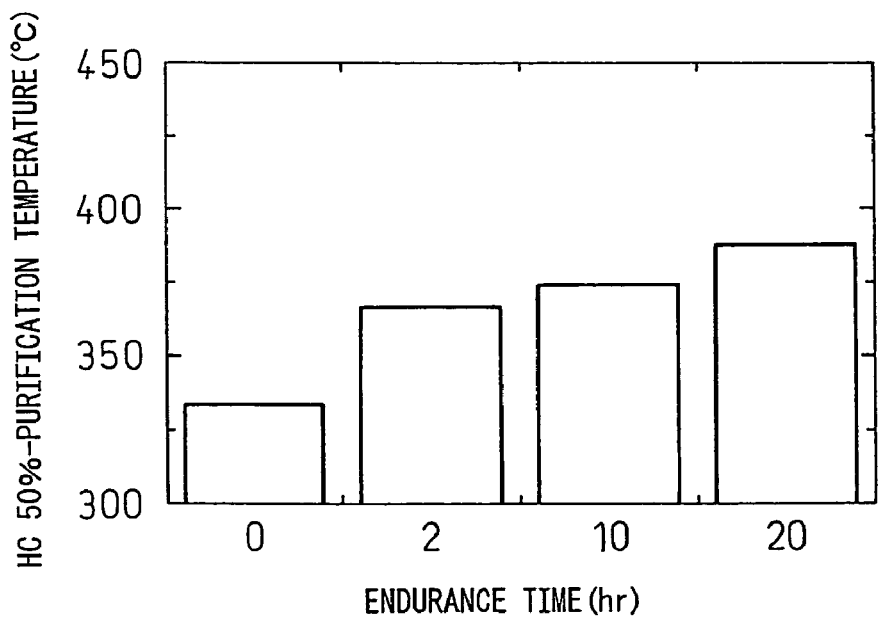
FIG. 6 is a view showing an HC50% purification temperature by an exhaust gas purification catalyst of the present invention comprised of a lanthanum oxide-silica composite oxide catalyst carrier of the present invention carrying platinum.

The results of evaluation of the HC50% purification temperature are shown in FIG. 6. From FIG. 6, it is clear that sintering of the platinum particles progressed to a certain extent, but on the other hand the extent of degradation is extremely small and movement of platinum particles from the lanthanum-silica composite oxide carrier is inhibited. That is, it is learned that the interaction between the lanthanum-silica composite oxide and the platinum particles is extremely high.

Example 4

Figure 7:
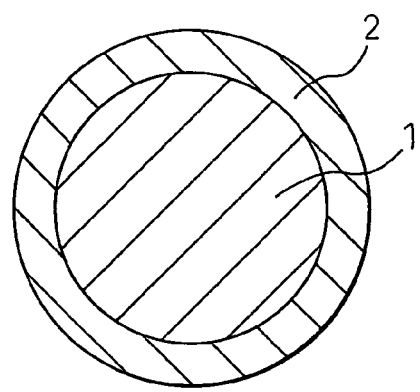
FIG. 7 is a view schematically showing the state of γ-alumina made to carry a lanthanum oxide-silica composite oxide carrier according to the present invention.

The composite oxide carrier according to the present invention was carried on a carrier with a higher heat resistance than this, that is, γ-alumina. If showing the structure schematically, the result becomes as shown in FIG. 7. The γ-alumina particles 1 carry a lanthanum oxide-silica composite oxide 2. Further, in practice, the γ-alumina particles coagulate and form a porous structure.

First, γ-alumina is prepared. This is made to absorb a TEOS alcohol solution. The excess solution is blown off, then the result is dried at 250° C. for 1 hour. After this, this is made to absorb a lanthanum nitrate solution, the excess solution is similarly blown off, then the result is dried at 250° C. for 1 hour. After making the carrier carry silicon and lanthanum in this way, the carrier is fired in the air at 800° C. for 2 hours to obtain a catalyst carrier of γ-alumina carrying a lanthanum oxide-silica composite oxide composite oxide ($La_{10}Si_6O_{27}$/γ-alumina).

This was made to carry a catalyst component comprised of 1 wt % of platinum particles in accordance with an ordinary method, was fired in the air at 800° C. for 2 hours, then was measured for particle size of the platinum particles. The results are shown in the following Table 5 together with the measurement results for the lanthanum oxide-silica composite oxide composite oxide ($La_{10}Si_6O_{27}$) catalyst carrier in the above Example 1 and the measurement results for γ-alumina.

TABLE 5

Effect of LaSi-Based Composite Oxide ($La_{10}Si_6O_{27}$) Surface Forming Catalyst

| Carrier | Particle size (nm) |
|---|---|
| $La_{10}Si_6O_{27}$ (invention) | 5.6 |
| $La_{10}Si_6O_{27}$/γ-alumina (invention) | 6.5 |
| γ-alumina (conventional) | 50.1 |

As clear from Table 5, both when making the carrier as a whole a lanthanum oxide-silica composite oxide composite oxide and when the surface of the γ-alumina is formed with a lanthanum oxide-silica composite oxide composite oxide, it was confirmed that the platinum particle size after firing is small and the sintering inhibiting effect of the precious metal catalyst particles is superior compared with the carrier of the conventional γ-alumina.

Example 5

Below, the effects of inhibiting sintering of precious metal particles other than platinum will be explained.

Regarding the sintering of precious metal, it is known that sintering progresses in accordance with the empirical formula shown next:

$$1/S_{pr}^n = 1/S_o^n + kt \qquad (1)$$

(where $S_{pr}$ is the surface area of the precious metal particles, $S_o$ is the initial precious metal particle surface area, k and n are any constants, and t is the time).

Here, the degree n is usually 2, therefore the above formula can be expressed as follows:

$$1/S_{pr}^2 = 1/S_o^2 + kt \qquad (2)$$

To correctly evaluate the effect of sintering, it is necessary to enter an actual physical quantity into this formula.

First, regarding the ordinate, if the amount of the precious metal carried on the catalyst carrier is the same, the particle size d of the precious metal particles will be inversely proportional to the surface area $S_{pr}$ of the precious metal particles. Therefore, the relationship of the particle size d of the precious metal particles and the surface area $S_{pr}$ of the precious metal particles becomes as follows:

$$1/S_{pr} \propto d \qquad (3)$$

$$\therefore 1/S_{pr}^2 \propto d^2 \qquad (4)$$

(where d is the particle size of the precious metal particles, and $S_{pr}$ is the surface area of the precious metal particles)

Therefore, the ordinate can plot the $d^2$.

Next, the abscissa plots the time. Here, to accurately evaluate the interaction between the carrier and precious metal for carriers with different surface areas, the method of plotting the nondimensional time t on the abscissa is used.

In relation to this, the time until collision of the carried precious metal particles is proportional to the average distance between particles and, further, the average distance is proportional to the ½ power of the surface area of the carrier ($S_{sup}^{1/2}$). That is, if the surface area of the carrier is large, the time where free dispersion is possible without collision with other particles becomes longer and the ratio of the actual time to this average free flight time becomes smaller.

Therefore the dimensionless time t can be expressed as follows with respect to the actual heat degradation (endurance) time $t_r$:

$$t = t_r / S_{sup}^{1/2} \qquad (5)$$

Further, if the heat degradation time $t_r$ with respect to the samples in the test is constant, formula (5) can be expressed as follows:

$$t \propto 1/S_{sup}^{1/2} \qquad (6)$$

Therefore, the abscissa may plot $1/S_{sup}^{1/2}$.

From formulas (2), (4), and (6), the formula for sintering of a precious metal becomes as follows:

$$d^2 = k'/S_{sup}^{1/2} + Q \qquad (7)$$

(where d is particle size of the precious metal particles, $S_{sup}$ is the carrier surface area, and k' and Q are constants)

Under such an assumption, the inventors investigated the sintering of palladium (Pd) and rhodium (Rh). The results will be explained next. Palladium and rhodium both become oxides under a lean ratio. The vapor pressure is also small. Therefore, they do not sinter much at all. Therefore, the inventors investigated the sintering of particles of palladium and rhodium under a stoichiometric air-fuel ratio. The sintering of precious metal under a stoichiometric air-fuel ratio (or in a vacuum) is closely related to the melting point. The melting point is rhodium>>platinum>palladium. The lower the melting point, the greater the sintering. Therefore, with palladium, particularly large sintering occurs.

First, the inventors investigated palladium with its large tendency of sintering. Here, the inventors carried palladium on the carrier obtained as in Example 1 to obtain a catalyst, mounted this catalyst at the position of the exhaust manifold in the exhaust system of the gasoline engine, made the air-fuel ratio the stoichiometric air-fuel ratio, and operated the engine at an exhaust gas temperature of 900° C. for 2 hours. Further, the inventors similarly investigated rhodium with its small tendency of sintering.

The results are shown in the following Table 6.

TABLE 6

Results of Evaluation for Palladium and Rhodium

| | Carrier surface area (m$^2$/g) | Pd particle size (nm) | Rh particle size (nm) |
|---|---|---|---|
| $ZrO_2$ | 45.00 | 52.1 | 10.1 |
| $NdZrO_2$ | 48.49 | 48.5 | — |
| $NdAlO_{3.5}$ | 57.32 | 33.7 | — |
| $Nd_{10}Si_6O_{27}$ | 41.77 | 26.4 | 6.3 |
| $La_{10}Si_6O_{2y}$ | 38.80 | 20.4 | 6.0 |

Figure 8:
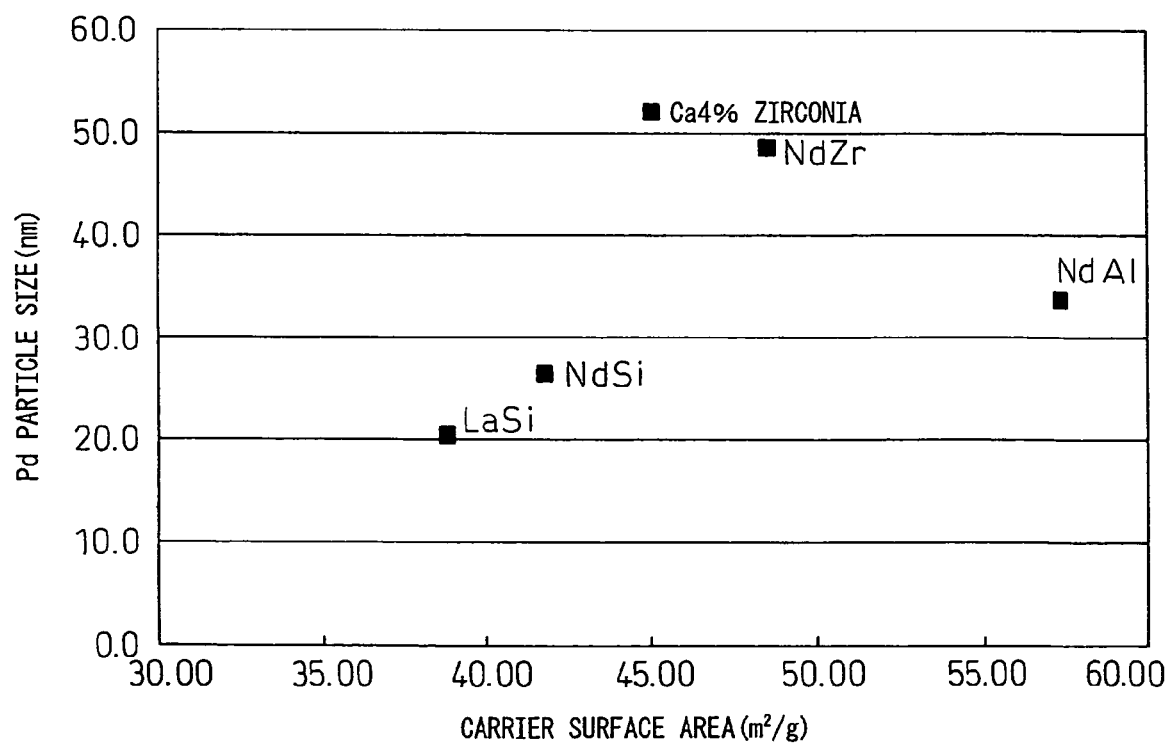
FIG. 8 is a view showing a difference of palladium particle sintering according to the carrier.
Figure 9:
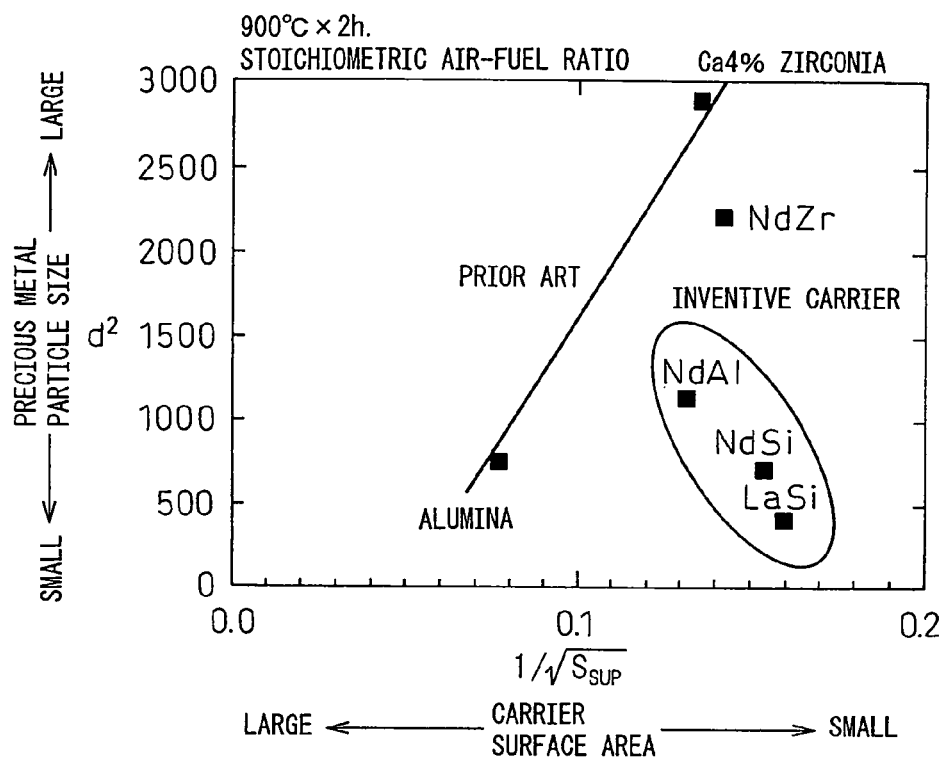
FIG. 9 is a view showing a difference of palladium particle sintering according to the carrier based on an empirical formula.

The results regarding palladium are shown in FIG. 8. Furthermore, the results regarding palladium are shown in FIG. 9 organized by the above relationship. In this FIG. 9, the abscissa plots the –½ power of the carrier surface area, while the ordinate plots the square of the palladium particles.

From these FIGS. 8 and 9, it will be understood that a clear sintering inhibiting effect was obtained by the carrier of the present invention compared with the carrier of the prior art. Further, the greatest effect was obtained by a silica-based composite oxide, while the effect was small with a zirconia-based one. Further, the fact that in this FIG. 9, the carrier of the present invention is at the bottom right side of the carrier of the prior art means that the carrier of the present invention inhibits sintering of palladium despite the carrier being relatively small in surface area.

Figure 10:
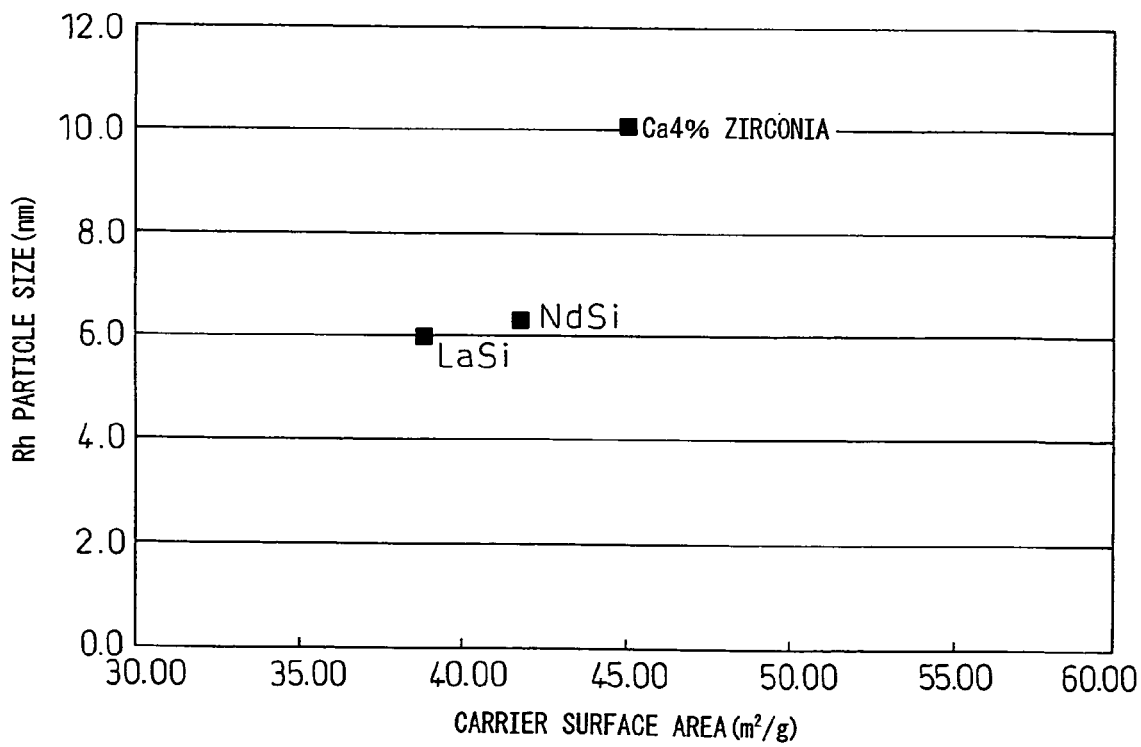
FIG. 10 is a view showing a difference of rhodium particle sintering according to the carrier.
Figure 11:
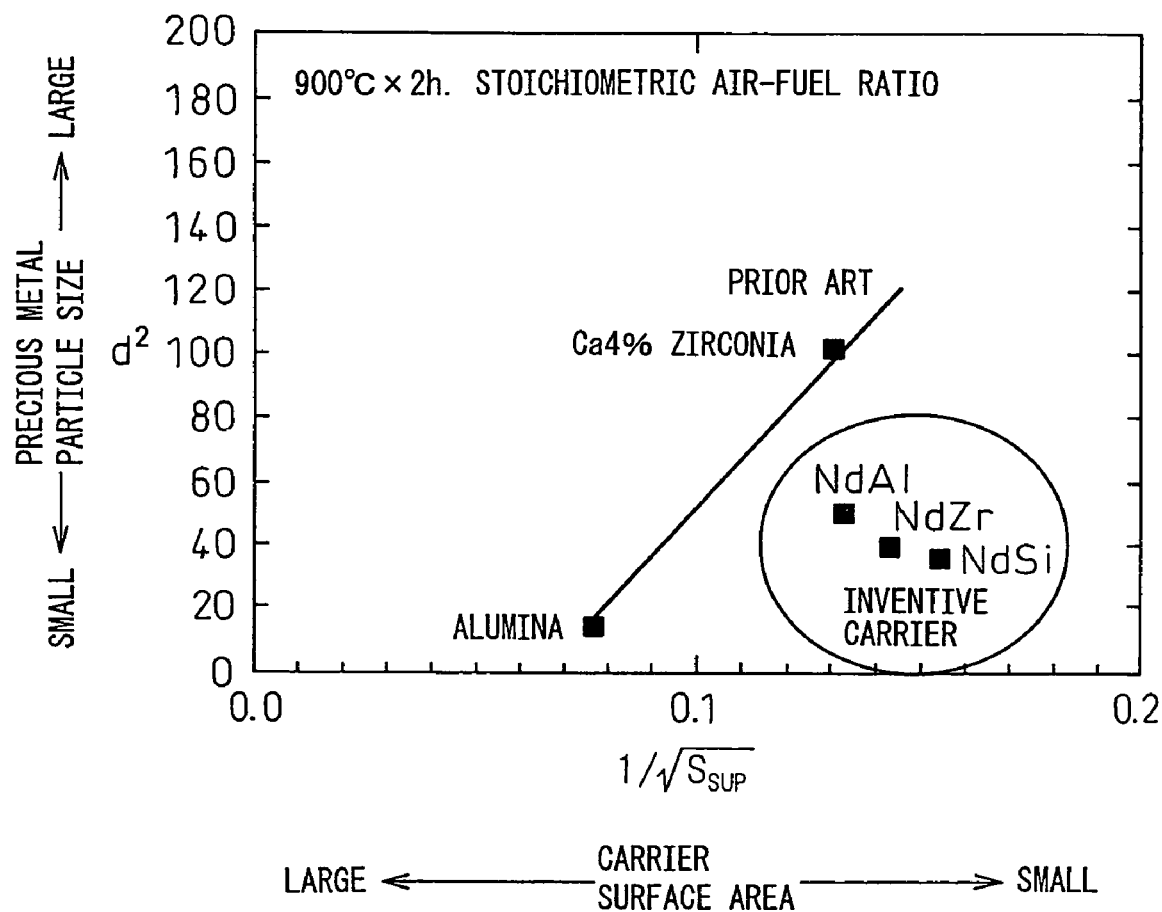
FIG. 11 is a view showing a difference of rhodium particle sintering according to the carrier based on an empirical formula.

Further, the results regarding palladium are shown in FIG. 10. Furthermore, the results regarding palladium are shown in FIG. 11 organized by the above relationship. In this FIG. 11, the abscissa plots the –½ power of the carrier surface area, while the ordinate plots the square of the diameter of the palladium particles.

From these FIGS. 10 and 11, it will be understood that a clear sintering inhibiting effect was obtained by the carrier of the present invention compared with the carrier of the prior art. While the results are similar to the above, the difference due to the pairs of elements of the composite oxide was extremely small. However, at this temperature, the effect of the size of the surface area of the carrier strongly appears. In terms of absolute value, the rhodium particles on the alumina were the smallest.

In this way, it was confirmed that despite the fact that the carrier of the present invention has a small surface area, sintering of the precious metal particles was inhibited.

INDUSTRIAL APPLICABILITY

As explained above, the carrier of the present invention carries precious metal catalyst particles, whereby an exhaust gas purification catalyst is obtained. This is exposed to an oxidizing atmosphere and reducing atmosphere under a high temperature. With the exhaust gas purification catalyst of the present invention, sintering of the precious metal particles with the catalyst activity is inhibited, the increase of the particle size is inhibited, and the state of a large specific surface area of the precious metal particles is maintained, so the purification function of the exhaust gas is maintained well over a long period.

The invention claimed is:

1. A catalyst carrier, comprising:
    a composite oxide of an electron accepting element, having an electron accepting property of accepting electrons from a precious metal element of precious metal catalyst particles by the approach or contact with the precious metal element and not changing in atomic valence by an oxidation reduction reaction, and another element,
    wherein said electron accepting element is selected from the group consisting of lanthanum, neodymium, yttrium, and combinations of the same, said other element is selected from the group consisting of silicon, zirconium, titanium, and combinations of the same, and a molar ratio of said electron accepting element to a total of said electron accepting element and said other element is more than 0.5 and less than or equal to 0.7.

2. A catalyst carrier as set forth in claim 1, wherein
    said electron accepting element is selected from the group consisting of lanthanum, neodymium, yttrium, and combinations of the same, said other element is silicon, and a molar ratio of said electron accepting element to a total of said electron accepting element and said other element is more than 0.5 and less than or equal to 0.7.

3. A catalyst carrier as set forth in claim 2, wherein said electron accepting element is lanthanum, said other element is silicon, and a molar ratio of lanthanum to the total of lanthanum and silicon (La/(La+Si)) is more than 0.5 and less than or equal to 0.7.

4. A catalyst carrier as set forth in claim 2, wherein said electron accepting element is neodymium, said other element is silicon, and a molar ratio of neodymium to a total of neodymium and silicon (Nd/(Nd+Si)) is more than 0.5 and less than or equal to 0.7.

5. A catalyst carrier as set forth in claim 2, wherein said electron accepting element is yttrium, said other element is silicon, and a molar ratio of yttrium to a total of yttrium and silicon (Y/(Y+Si)) is more than 0.5 and less than or equal to 0.7.

6. A catalyst carrier as set forth in claim 1, wherein said electron accepting element is selected from the group consisting of lanthanum, neodymium, yttrium, and combinations of the same, said other element is selected from the group consisting of zirconium, titanium, and combinations of the same, and a molar ratio of said electron accepting element to a total of said electron accepting element and said other element is more than 0.5 and less than of equal to 0.7.

7. A catalyst carrier as set forth in claim 6, wherein said electron accepting element is neodymium, said other element is zirconium, and a molar ratio of neodymium to a total of neodymium and zirconium (Nd/(Nd+Zr)) is more than 0.5 and less than or equal to 0.7.

8. A catalyst carrier as set forth in claim 6, wherein said electron accepting element is selected from the group consisting of lanthanum, neodymium, yttrium and combinations of the same said other element is titanium, and a molar ratio of said electron accepting element to a total of said electron accepting element and said other element is more than 0.5 and less than or equal to 0.7.

9. A catalyst carrier as set forth in claim 8, wherein said electron accepting element is lanthanum, said other element is titanium, and a molar ratio of lanthanum to a total of lanthanum and titanium (La/(La+Ti)) is more than 0.5 and less than or equal to 0.7.

10. A catalyst carrier as set forth in claim 8, wherein said electron accepting element is neodymium, said other element is titanium, and a molar ratio of neodymium to a total of neodymium and titanium (Nd/(Nd+Ti)) is more than 0.5 and less than or equal to 0.7.

11. A catalyst carrier as set forth in claim 8, wherein said electron accepting element is yttrium, said other element is titanium, and a molar ratio of yttrium to a total of yttrium and titanium (Y/(Y+Ti)) is more than 0.5 and less than or equal to 0.7.

12. A catalyst carrier as set forth in claim 1, wherein said composite oxide has an electronegativity of 2.55 to 2.80.

13. An exhaust gas purification catalyst comprising a catalyst carrier on which precious metal catalyst particles are carried, wherein the catalyst carrier comprises;
   a composite oxide of an electron accepting element, having an electron accepting property of accepting electrons from a precious metal element of precious metal catalyst particles by the approach or contact with the precious metal element and not changing in atomic valence by an oxidation in reduction reaction, and another element,
   wherein said electron accepting element is selected from the group consisting of lanthanum, neodymium, yttrium, and combinations of the same, said other element is selected from the group consisting of silicon, zirconium, titanium, and combinations of the same, and a molar ratio of said electron accepting element to a total of said electron accepting element and said other element is more than 0.5 and less than or equal to 0.7.

14. An exhaust gas purification catalyst as set forth in claim 13, wherein said precious metal catalyst particles are selected from the group consisting of platinum, palladium, and combinations of the same.

15. A method for producing a catalyst carrier as set forth in claim 1, comprising:
   providing a dispersion made of a hydrophobic solvent phase in which a water soluble phase is dispersed;
   hydrolyzing a salt of an electron accepting element and a salt of another element in the water soluble phase dispersed in the dispersion to cause a metal oxide precursor to precipitate and making this metal oxide precursor coagulate; and
   drying and firing the coagulated metal oxide precursor;
   wherein the catalyst carrier is formed in the method.

* * * * *